Aug. 27, 1957   L. HOKKANEN   2,804,310
CROSSBAR ATTACHMENT FOR BICYCLES

Filed May 14, 1954                                    2 Sheets-Sheet 1

INVENTOR.
Lauri Hokkanen
BY George H. Kennedy Jr.
ATTORNEY

Aug. 27, 1957 L. HOKKANEN 2,804,310
CROSSBAR ATTACHMENT FOR BICYCLES
Filed May 14, 1954 2 Sheets-Sheet 2

INVENTOR.
Lauri Hokkanen
BY
ATTORNEY

United States Patent Office 2,804,310
Patented Aug. 27, 1957

2,804,310

CROSSBAR ATTACHMENT FOR BICYCLES

Lauri Hokkanen, Winchendon, Mass., assignor to O. W. Siebert Company, Gardner, Mass., a corporation of Massachusetts Application May 14, 1954, Serial No. 429,768

2 Claims. (Cl. 280—7.11)

This invention pertains to bicycles. More particularly, this invention relates to an attachment which can be applied to a woman's or girl's type of bicycle so as to convert the bicycle into a man's or boy's type of bicycle.

It is an important object of this invention to provide an attachment of the type described wherein the bicycle itself requires fewer changes from the conventional structure of a woman's or girl's type of bicycle in order to adapt itself to the attachment.

It is also an object of this invention to provide an attachment of the type described which is simpler and more easily applied than prior art attachments used for the same general purpose.

Other and further objects and advantageous features of this invention will hereinafter more fully appear in connection with a detail description of the drawings, in which Fig. 1 is a side view of a woman's or girl's type of bicycle to which my attachment may be applied.

Figure 1:
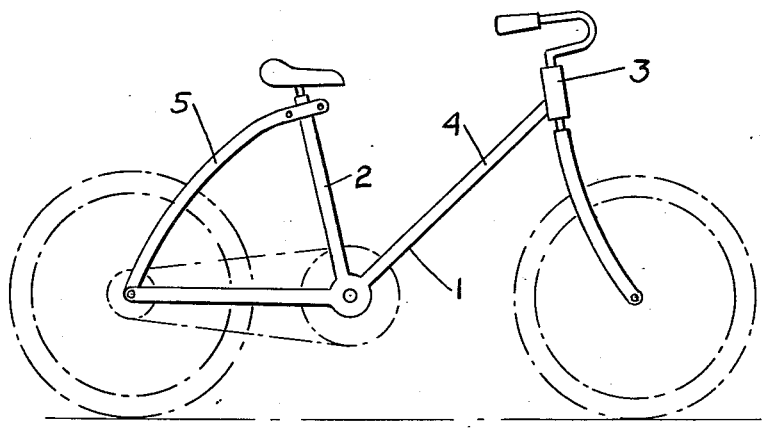

Referring to the drawings in detail, Fig. 1 shows a woman's or girl's bicycle of substantially conventional type. Said bicycle's frame 1 provides a substantially upright tubular saddle pillar 2, from whose lower end extends an upwardly and forwardly inclined stay tube 4; to the latter's upper end is secured in conventional fashion, the frame's head tube 3, wherein is journaled the usual steering post for the bicycle's front wheel. A rear frame member 5 which provides a support for the bicycle's rear wheel is attached at its upper end 6 to the saddle pillar 2.

Figure 5:
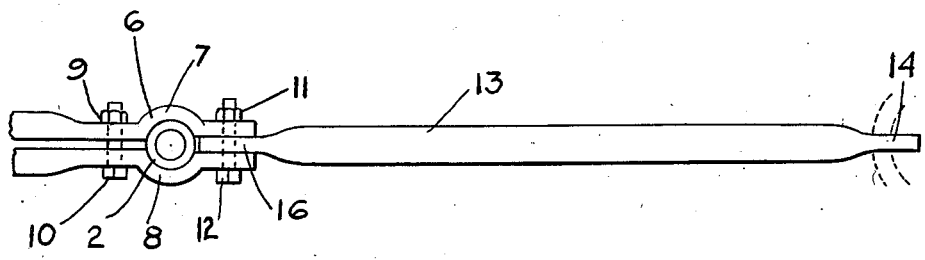
Fig. 5 is a plan view of the crossbar showing its connecting relationship with the frame's tubular saddle pillar.

The upper end 6 of frame member 5 is bifurcated as best shown in Fig. 5, to provide for clamping of the saddle pillar 2 between opposite outwardly curved portions 7 and 8 of its two sides. The latter are drawn together, for such clamping action, by means of nuts 9 and 11, threaded onto rear and front bolts 10 and 12 respectively that pass through alined holes of said two sides. This construction of the upper end 6 of frame member 5 provides saddle pillar 2 near its upper end with a forwardly-extending bifurcated bracket; the latter serves, as hereinafter described, for the attachment of an additional frame member, in the conversion of the above-described woman's or girl's bicycle to a man's or boy's bicycle.

Figure 3:
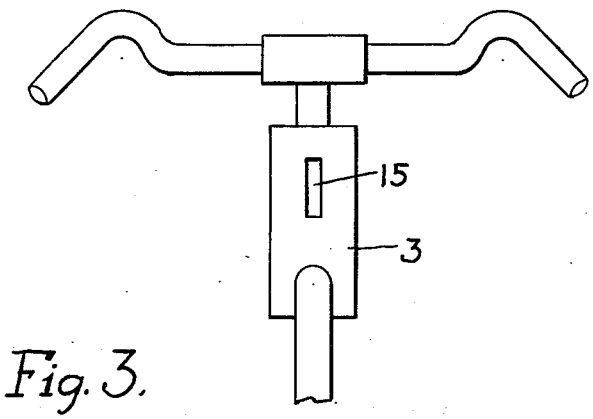
Fig. 3 is a rear view of the frame's head tube, which receives the steering post, and showing the slot for receiving the end of the crossbar.
Figure 4:
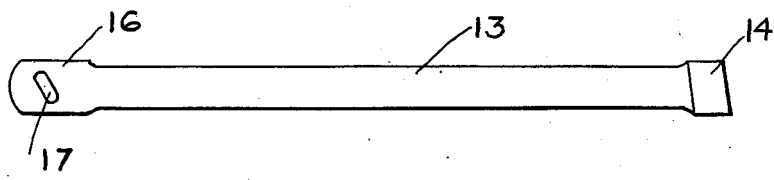
Fig. 4 is a side view of the crossbar itself.

Said additional frame member is here shown as a substantially tubular crossbar 13 which is flattened at its ends as shown at 14 and 16. To install said crossbar 13, bolt 12 is removed, and then the crossbar's flattened end 14 is inserted into a vertical slot 15 (see Fig. 3) formed in the rear face of head tube 3. The crossbar's other flattened end 16 is placed between the bifurcations of frame member 5 such that bolt 12, upon being replaced, will pass through an inclined slot 17 provided in the flattened end 16 of the crossbar. Nuts 9 and 11 are thereupon tightened up on their bolts, to re-establish the firm gripping engagement of curved bracket portions 7 and 8 with the saddle pillar 2. Thus the woman's or girl's bicycle of Fig. 1 is quickly converted into a man's or boy's type of bicycle.

By virtue of the fact that slot 17 is inclined, bar 13 will tend to be urged forwardly as force is exerted downwardly on the bar; this condition would rise, as is often the case, when one boy rides another on the crossbar. Therefore, the crossbar, under these conditions, cannot become displaced, but is urged forward into slot 15 even more firmly. This latter provision, i. e. the inclined slot, constitutes a safety feature of my invention.

As can be seen from Fig. 1, without the attachment, the bicycle corresponds substantially to the conventional woman's or girl's type of bicycle; there are no protruding sockets or connecting elements which would detract from the conventional appearance of the vehicle.

Figure 2:
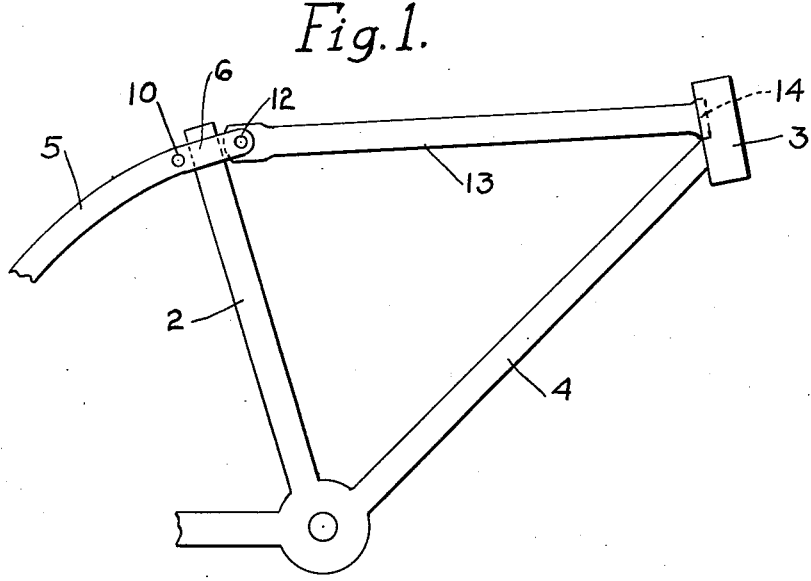
Fig. 2 is a larger scale side view of the frame construction of Fig. 1, showing by detachable crossbar installed so as to convert the bicycle into a man's or boy's type of bicycle.

Likewise, in Fig. 2, with the attachment applied, the vehicle has the appearance of a conventional man's or boy's type of bicycle with a substantially triangular central frame portion.

Although I have described my invention with particular reference to the drawings, it is obvious that the device admits of modifications which are within the spirit of the invention.

I claim:

1. In a bicycle frame construction of the class described, a substantially upright saddle pillar, a forwardly supported head tube having a slot which faces said saddle pillar, a bifurcated bracket secured to and extending forwardly from the upper end of said saddle pillar, a detachable crossbar flattened at its front end to enter the head tube's slot, and flattened at its rear end for reception between the bifurcations of said bracket, and a removable retaining bolt extending through registering apertures of said bifurcations and said flattened rear end for supporting said crossbar in operative position, the aperture of said crossbar's flattened rear end being a forwardly and downwardly inclined slot, whereby downward pressure on said crossbar will thrust its front end further into the slot of said head tube.

2. In a bicycle frame construction of the class described, a substantially upright saddle pillar, a forwardly supported head tube having a slot which faces said saddle pillar, a rear frame member, having its upper end bifurcated, for clamping attachment to the upper end of said saddle pillar, with said bifurcations extending forwardly thereof, a detachable crossbar flattened at its front end to enter the head tube's slot, and flattened at its rear end for reception between the forwardly extending bifurcations of said rear frame member, and a removable retaining bolt extending through registering apertures of said bifurcations and said flattened rear end for supporting said crossbar in operative position, the aperture of said crossbar's flattened rear end being a forwardly and downwardly inclined slot, whereby downward pressure on said crossbar will thrust its front end further into the slot of said head tube.

References Cited in the file of this patent

UNITED STATES PATENTS

| 591,673 | Maltby | Oct. 12, 1897 |
| 1,703,174 | Roe | Feb. 26, 1929 |
| 2,386,178 | Anderson | Oct. 9, 1945 |

FOREIGN PATENTS

| 450,313 | France | Jan. 16, 1913 |